(12) United States Patent
Hirzel et al.

(10) Patent No.: US 12,118,400 B2
(45) Date of Patent: Oct. 15, 2024

(54) PERFORMING BATCHED TRAINING FOR MACHINE-LEARNING PIPELINES

(71) Applicant: International Business Machines Corporation, Armonk, NY (US)

(72) Inventors: Martin Hirzel, Chappaqua, NV (US); Kiran A. Kate, Chappaqua, NY (US); Avraham Ever Shinnar, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 17/537,258

(22) Filed: Nov. 29, 2021

(65) Prior Publication Data

US 2023/0168938 A1     Jun. 1, 2023

(51) Int. Cl.
*G06F 9/50*     (2006.01)
*G06F 9/48*     (2006.01)
*G06N 20/00*     (2019.01)

(52) U.S. Cl.
CPC .......... *G06F 9/5038* (2013.01); *G06F 9/4881* (2013.01); *G06F 9/505* (2013.01); *G06N 20/00* (2019.01)

(58) Field of Classification Search
CPC ...... G06F 9/5038; G06F 9/4881; G06F 9/505; G06N 20/00
See application file for complete search history.

(56) References Cited

U.S. PATENT DOCUMENTS

| | | | |
|---|---|---|---|
| 11,392,847 B1* | 7/2022 | Abdollahian | G06N 20/00 |
| 2016/0371601 A1* | 12/2016 | Grove | G06N 20/00 |
| 2019/0042956 A1* | 2/2019 | Huang | G06N 7/08 |
| 2019/0293620 A1* | 9/2019 | Farkas | G01N 21/3563 |
| 2020/0005045 A1 | 1/2020 | Lloyd, II et al. | |
| 2020/0027032 A1* | 1/2020 | Morimura | G06N 7/08 |
| 2020/0081916 A1 | 3/2020 | McShane et al. | |
| 2020/0242487 A1* | 7/2020 | Jain | G06N 5/04 |
| 2020/0272947 A1 | 8/2020 | Carullo et al. | |
| 2020/0380416 A1 | 12/2020 | Zion et al. | |
| 2021/0110254 A1* | 4/2021 | Hoang | G06F 40/58 |
| 2021/0150355 A1* | 5/2021 | Gendron-Bellemare | G06N 3/044 |
| 2021/0357190 A1* | 11/2021 | Mahanta | G06F 9/451 |
| 2021/0374547 A1* | 12/2021 | Wang | G06N 3/047 |
| 2022/0366300 A1* | 11/2022 | Hsieh | G06N 5/01 |

(Continued)

FOREIGN PATENT DOCUMENTS

| | | |
|---|---|---|
| CN | 109977988 A | 7/2019 |
| CN | 111459988 A | 7/2020 |
| WO | 2020201835 A1 | 10/2020 |

OTHER PUBLICATIONS

Rocklin, M., "Dask: Parallel Computation with Blocked algorithms and Task Scheduling," Proceedings of the 14th Python in Science Conference (SciPy), 2015, pp. 130-136.

(Continued)

*Primary Examiner* — Dong U Kim (74) *Attorney, Agent, or Firm* — Zilka-Kotab, P.C.

(57) ABSTRACT

A computer-implemented method according to one embodiment includes identifying a machine learning pipeline and a plurality of training data batches; creating a plurality of tasks, based on the machine learning pipeline; and determining an order in which the plurality of tasks is executed, utilizing a resource usage-aware approach.

20 Claims, 6 Drawing Sheets

(56) References Cited

U.S. PATENT DOCUMENTS

2022/0383082 A1* 12/2022 Zhang .................... G06N 3/045
2022/0414503 A1* 12/2022 Park ..................... G06F 9/4881

OTHER PUBLICATIONS

Moritz et al., "Ray: A Distributed Framework for Emerging AI Applications," Proceedings of the 13th USENIX Symposium on Operating Systems Design and Implementation (OSDI '18), Oct. 2018, pp. 561-577.
Ahn et al., "Ordering Chaos: Memory-Aware Scheduling of Irregularly Wired Neural Networks for Edge Devices," Proceedings of the 3rd MLSys Conference, 2020, 14 pages.

* cited by examiner

PERFORMING BATCHED TRAINING FOR MACHINE-LEARNING PIPELINES

BACKGROUND

The present invention relates to machine learning pipelines, and more specifically, this invention relates to performing batched training of machine learning pipelines.

Machine learning is a popular means of decision making and is used in many different fields today. Machine learning implementations need to be trained in order to function correctly, and when performing training in a machine learning environment, the training data may be too large to fit in memory. When working with just a single machine-learning operator, one solution to this problem is batch-wise training. In this approach, the training data is split into smaller pieces called batches, such that any given batch can fit in memory even if the entire data does not. Unfortunately, this approach only solves the problem of training one machine-learning operator on a large data set. As a result, there is currently a need to optimize the training of an entire pipeline that contains multiple machine-learning operators on a large data set.

SUMMARY

A computer-implemented method according to one embodiment includes identifying a machine learning pipeline and a plurality of training data batches; creating a plurality of tasks, based on the machine learning pipeline; and determining an order in which the plurality of tasks is executed, utilizing a resource usage-aware approach.

According to another embodiment, a computer program product includes one or more computer readable storage media, and program instructions collectively stored on the one or more computer readable storage media, where the program instructions include instructions configured to cause one or more processors to perform a method including identifying, by the one or more processors, a machine learning pipeline and a plurality of training data batches; creating, by the one or more processors, a plurality of tasks, based on the machine learning pipeline; and determining, by the one or more processors, an order in which the plurality of tasks is executed, utilizing a resource usage-aware approach.

According to another embodiment, a system includes a processor; and logic integrated with the processor, executable by the processor, or integrated with and executable by the processor, where the logic is configured to identify a machine learning pipeline and a plurality of training data batches; create a plurality of tasks, based on the machine learning pipeline; and determine an order in which the plurality of tasks is executed, utilizing a resource usage-aware approach.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for performing batched training for machine-learning pipelines.

In one general aspect, a computer-implemented method includes identifying a machine learning pipeline and a plurality of training data batches; creating a plurality of tasks, based on the machine learning pipeline; and determining an order in which the plurality of tasks is executed, utilizing a resource usage-aware approach.

In another general aspect, a computer program product includes one or more computer readable storage media, and program instructions collectively stored on the one or more computer readable storage media, where the program instructions include instructions configured to cause one or more processors to perform a method including identifying, by the one or more processors, a machine learning pipeline and a plurality of training data batches; creating, by the one or more processors, a plurality of tasks, based on the machine learning pipeline; and determining, by the one or more processors, an order in which the plurality of tasks is executed, utilizing a resource usage-aware approach.

In another general aspect, a system includes a processor; and logic integrated with the processor, executable by the processor, or integrated with and executable by the processor, where the logic is configured to identify a machine learning pipeline and a plurality of training data batches; create a plurality of tasks, based on the machine learning pipeline; and determine an order in which the plurality of tasks is executed, utilizing a resource usage-aware approach.

Figure 1:
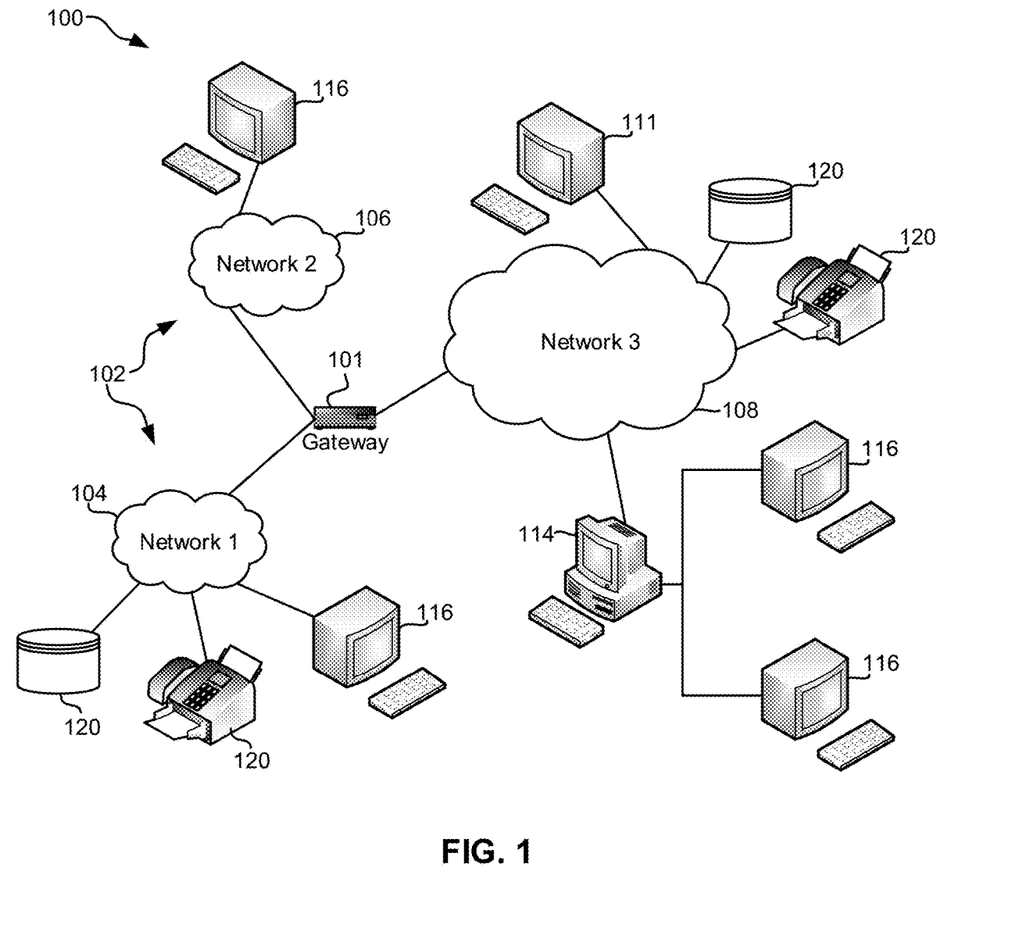
FIG. 1 illustrates a network architecture, in accordance with one aspect of the present invention.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one aspect.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some aspects.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
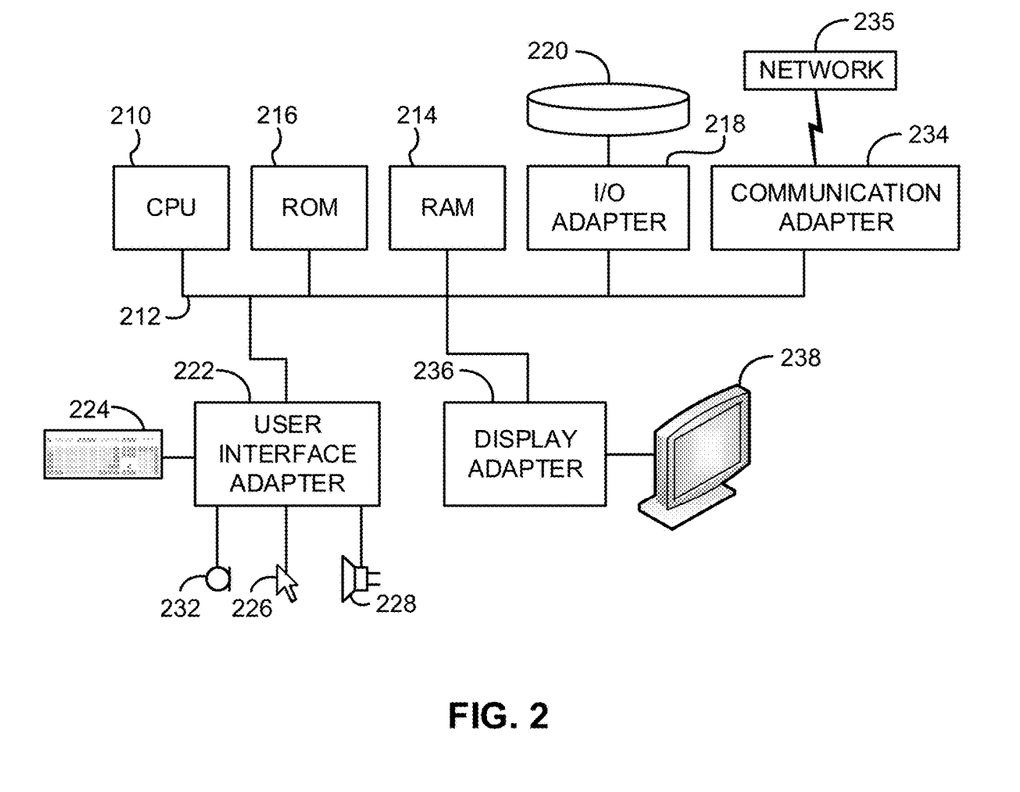
FIG. 2 shows a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one aspect. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred aspect may also be implemented on platforms and operating systems other than those mentioned. A preferred aspect may be written using XML, C, and/or C++ language, or other programming languages, along with an object oriented programming methodology. Object oriented programming (OOP), which has become increasingly used to develop complex applications, may be used.

Figure 3:
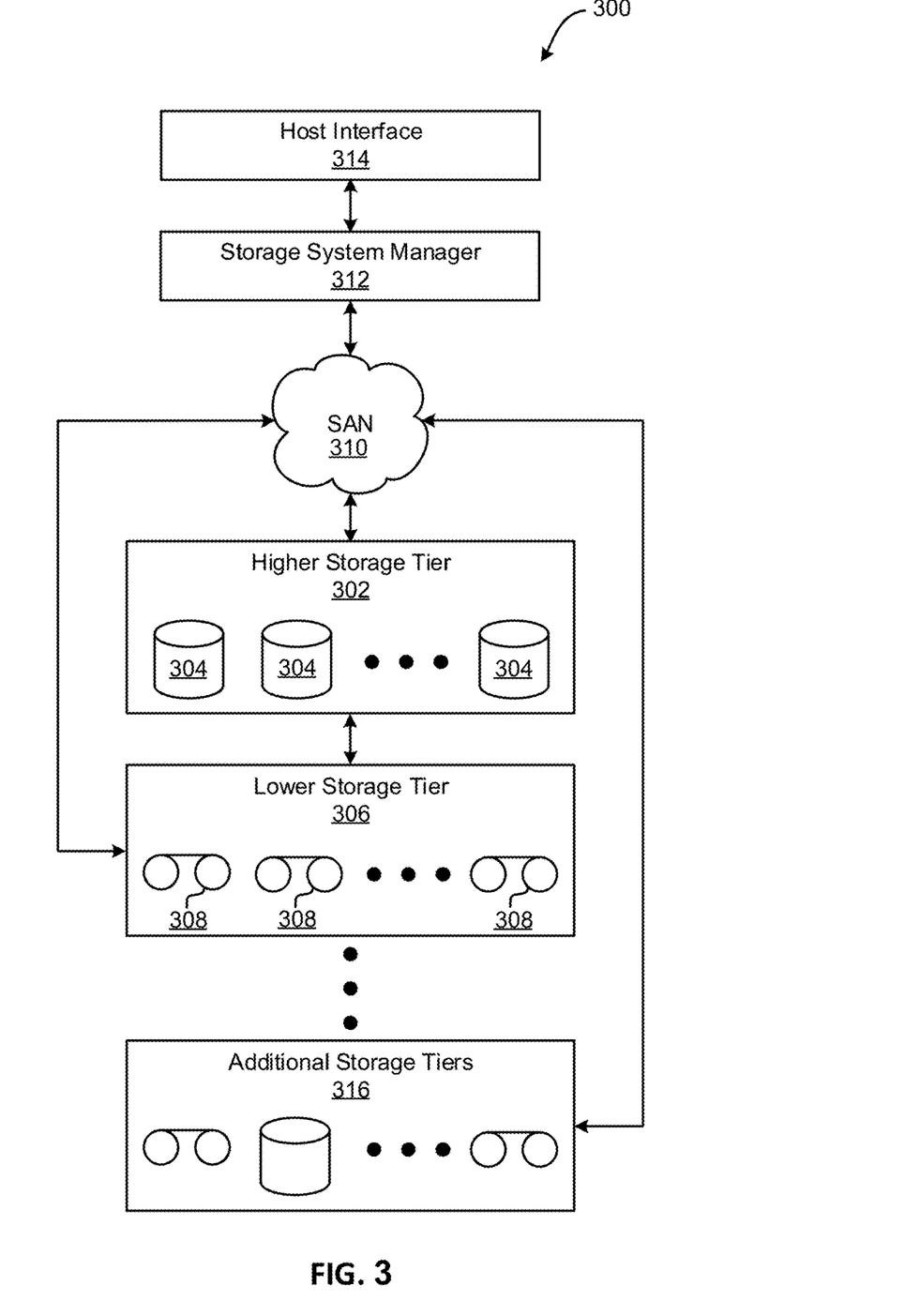
FIG. 3 illustrates a tiered data storage system in accordance with one aspect of the present invention.

Now referring to FIG. 3, a storage system 300 is shown according to one aspect. Note that some of the elements shown in FIG. 3 may be implemented as hardware and/or software, according to various aspects. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the aspects presented herein.

According to some aspects, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various aspects.

Figure 4:
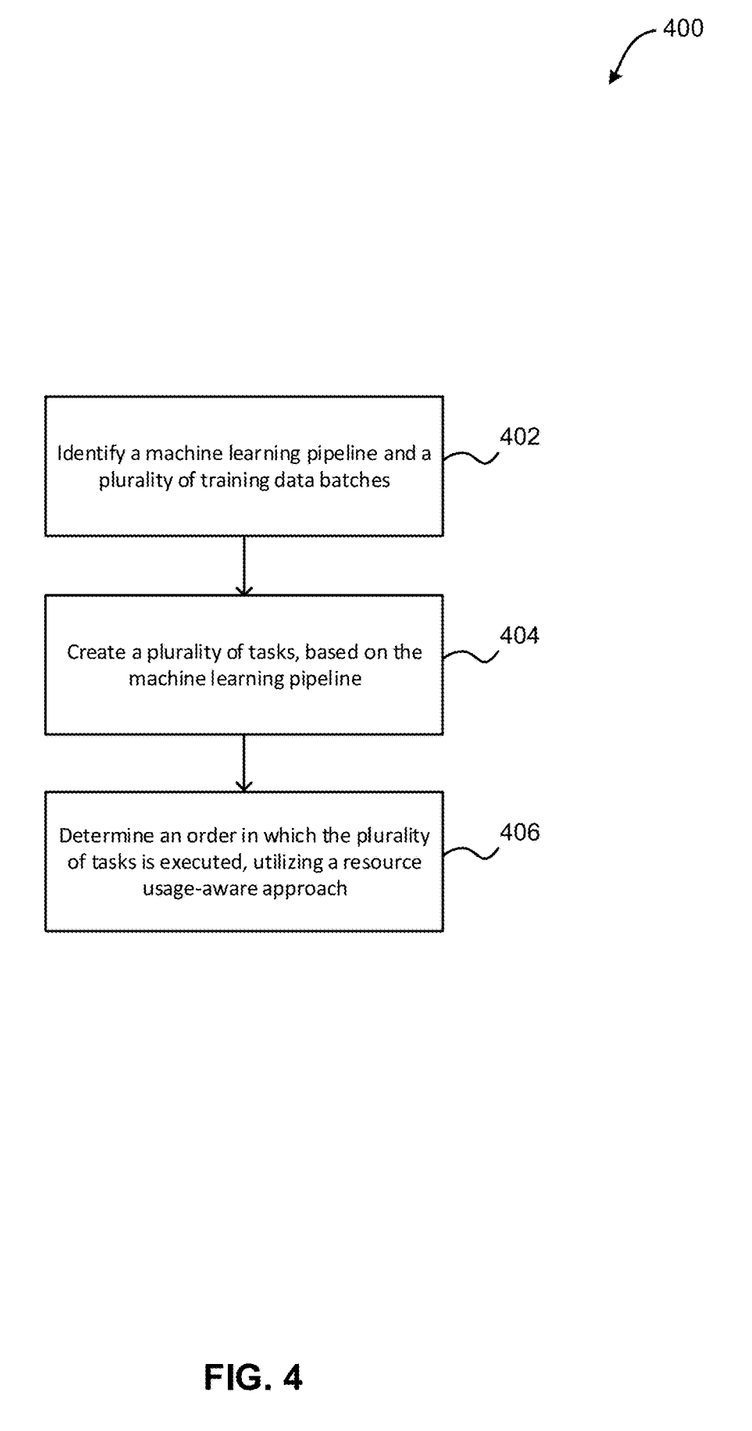
FIG. 4 illustrates a method for performing batched training for machine-learning pipelines, in accordance with one aspect of the present invention.

Now referring to FIG. 4, a flowchart of a method 400 is shown according to one aspect. The method 400 may be performed in accordance with the present invention in any of the environments depicted in FIGS. 1-3 and 5, among others, in various aspects. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various aspects, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a machine learning pipeline and a plurality of training data batches are identified. In one aspect, the machine learning pipeline may include a plurality of operators. For example, each of the plurality of operators may include a machine learning model (e.g., a neural network operator, a random forest operator, a stochastic gradient dissent (SGD) operator, a principal component analysis (PCA) operator, etc.).

Additionally, in one aspect, each of the plurality of operators may be connected to another of the operators via a data flow edge within the machine learning pipeline. For example, the data flow edge may indicate a flow of data from one operator to another operator. In another example, a data flow edge from a first operator to a second operator may indicate that results of processing data at the first operator (e.g., output of the first operator) are sent as input to the second operator.

Further, in one aspect, the machine learning pipeline may include an arrangement (e.g., a graph, grouping, etc.) of a plurality of operators configured for one or more predetermined tasks. In another aspect, the training data batches may include subsets of a larger group of training data. In yet another aspect, the larger group of training data may be divided into batches due to data storage constraints within a machine learning training environment.

Further still, in one aspect, each of the plurality of training data batches may include multiple instances of training data. For example, each instance of training data may include labeled ground truth data for training operators within the machine learning pipeline. In another aspect, the machine learning pipeline may be linear or non-linear. For example, the machine learning pipeline may have two or more parallel processing paths.

Also, method 400 may proceed with operation 404, where a plurality of tasks is created based on the machine learning pipeline. In one aspect, plurality of tasks may include a task graph. In another aspect, the task graph may include a logical organization of tasks performed by each of the operators within the machine learning pipeline. In yet another aspect, the task graph may be created by analyzing tasks performed by each of the operators within the machine learning pipeline.

For example, dependencies between the tasks may be identified and incorporated into the task graph. In another example, an edge within the task graph may indicate a dependency. For instance, an edge between a first task and a second task may indicate that the first task creates output that is used by the second task.

In addition, in one aspect, each of the plurality of tasks may include an operation performed by an operator within the machine learning pipeline on training data. In another aspect, the tasks may include one or more transform tasks. For example, each transform task may include an instance where an operator takes training data as input and outputs computed data. In another example, the tasks may include one or more partial-fit tasks. For example, each partial-fit task may include an instance where an operator is trained partially using a single batch of the plurality of training data batches.

Furthermore, in one aspect, the tasks may include one or more load tasks. For example, each load task may include an instance where data is loaded (e.g., from a storage location such as a hard disk drive or other storage entity) and stored in local memory utilized by the machine learning pipeline. In another aspect, the tasks may include one or more spill tasks. For example, each spill task may include an instance where data is transferred from local memory utilized by the machine learning pipeline to a storage location such as a hard disk drive or other storage entity. In yet another aspect, the task graph may be created lazily. For example, a beginning task may be selected, and subsequent tasks may be added to the task graph in a dynamic manner as needed.

Further still, method 400 may proceed with operation 406, where an order in which the plurality of tasks is executed is determined utilizing a resource usage-aware approach. In one aspect, a schedule may be created that indicates the order in which the plurality of tasks is implemented. In another aspect, the resource-aware approach may account for resource usage (such as data loading and spilling) within the machine learning pipeline. For example, the order in which the plurality of tasks is implemented may be based on one or more of a pipeline topology, a batch spilling state, one or more available computational resources, etc.

Further, in one aspect, when the task graph indicates that a first task is eligible to be executed before a second task, the first task may occur before the second task within the schedule. In another aspect, when the task graph indicates that any of a plurality of tasks are eligible to be executed in a single time period, predetermined decision criteria may be applied to metadata associated with of each of the plurality of tasks to determine an order in which the tasks are to be performed within the schedule.

For example, the resource-aware approach may account for metadata associated with the plurality of tasks. For example, each of the plurality of tasks may have associated metadata. In another aspect, the associated metadata may include an identification of an associated operator (e.g., an operator that performs the task).

Also, in one aspect, the associated metadata may include a batch number (e.g., a batch ID) indicating which of the plurality of training data batches is used to perform the task. In another aspect, the associated metadata may include a type of the task being performed (e.g., a transform task, a partial-fit task, etc.). In yet another aspect, the associated metadata may include a status of memory associated with the task (e.g., a type of data stored within the machine learning pipeline that is associated with the task, etc.).

Additionally, in one aspect, the associated metadata may include a status of an execution associated with the task (e.g., whether the task has fully executed, as partially executed, etc.). In another aspect, the predetermined decision criteria may include a decision diagram. For example, the decision diagram may compare the metadata associated with each of the plurality of tasks and may determine an order in which the plurality of tasks are implemented (e.g., executed).

Further still, in one aspect, the decision diagram may prioritize one or more characteristics. For example, the decision diagram may prioritize a partial-fit task over a transform task, such that the partial-fit task is placed before the transform task within the determined order (and the partial-fit task is therefore executed before the transform task). In another example, the decision diagram may prioritize an avoidance of unnecessary load/spill tasks by giving schedule priority for tasks that use data already stored in local memory utilized by the machine learning pipeline.

Also, in one aspect, within the task graph, one or more tasks may be identified as moot. For example, a training task within the task graph that trains an operator may be identified as moot in response to determining that, according to the schedule, the operator is already trained before the training task occurs within the schedule. In another aspect, tasks identified as moot may be removed/trimmed from the schedule (e.g., utilizing an early termination operation, etc.).

In addition, in one aspect, the tasks may be implemented within the machine learning pipeline, according to the schedule. For example, to train the machine learning pipeline, data within the plurality of training data batches may be input to the tasks, and each of the tasks may be executed according to the schedule to perform the training. In another aspect, one or more of the plurality of training data batches may be cached and used for multiple different machine learning pipelines. For example, the order in which the plurality of tasks is implemented for a single machine learning pipeline may account for other pipelines.

Furthermore, in one aspect, multiple different machine learning pipelines may be trained in parallel. For example, the order in which the plurality of tasks is implemented for a single machine learning pipeline may account for other pipelines within the parallel training. In another aspect, multiple different tasks may be implemented in parallel within the schedule.

In this way, a machine learning pipeline may be trained utilizing training data batches in a usage-aware schedule that may avoid unnecessary data actions, such as resource-intensive loading and storing of data. Further, tasks identified as moot may be removed from the schedule, which may reduce an amount of processing performed during the training. As a result, computing hardware implementing such training (such as one or more computing devices, etc.) may experience a reduction in data loads and stores, as well as a reduction in processing performed during the training, which may improve a performance of such computing hardware. Further, by training the machine learning pipeline on separate data batches, training may be possible even when not all data batches can reside in local memory simultaneously.

Figure 5:
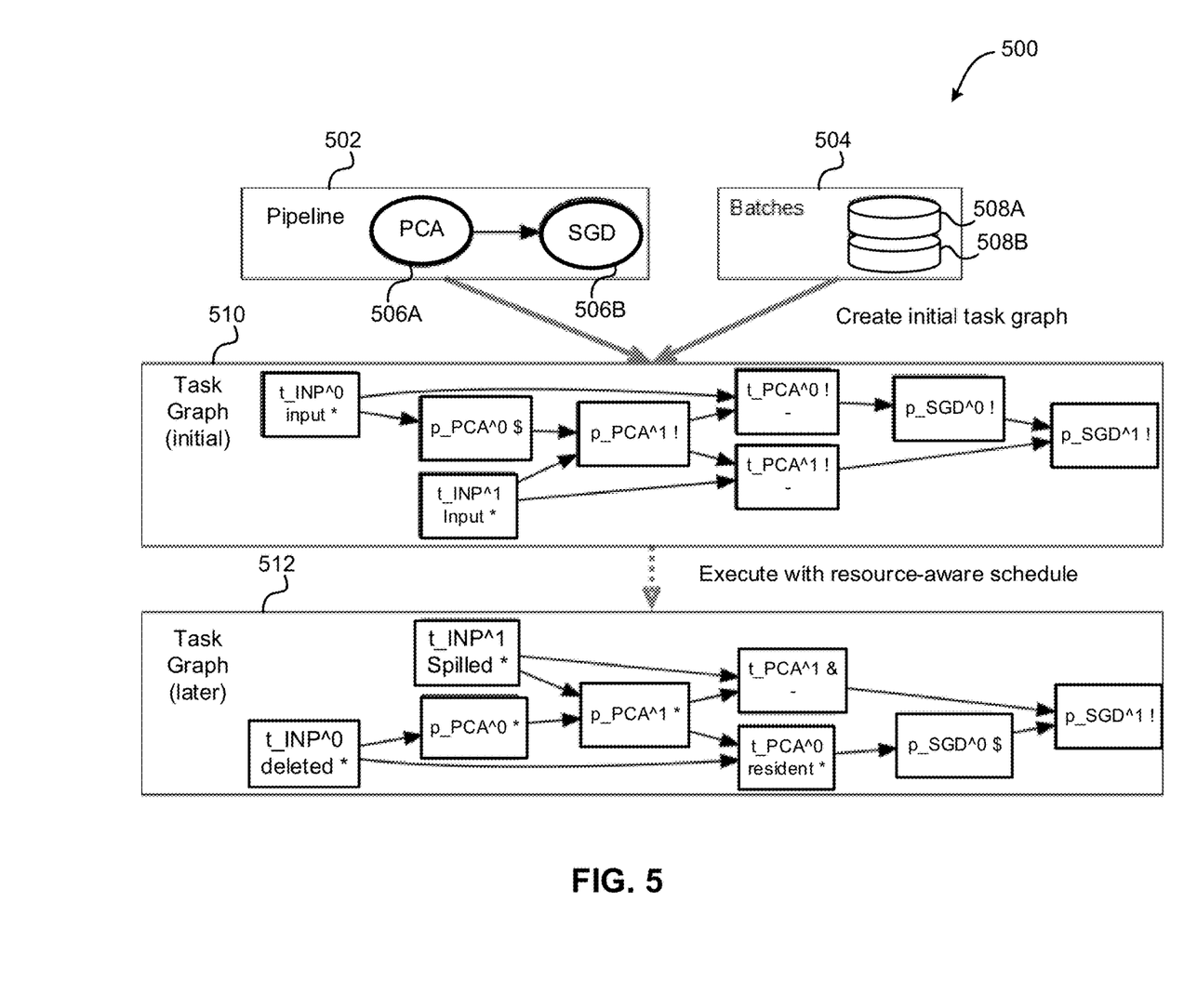
FIG. 5 illustrates an exemplary batched training execution, in accordance with one aspect of the present invention.

FIG. 5 illustrates an exemplary batched training execution 500, according to one exemplary aspect. As shown, two inputs are provided: a machine-learning pipeline 502 and a set of batches 504. The pipeline 502 consists of two machine-learning operators 506A-B. Although only two operators (PCA and SGD) are shown, more than two operators may be provided within a pipeline, and such operators may be connected in any acyclic topology. The batches 508A-B may include subsets of training data. Although only two batches 508A-B are shown, any number of batches may be provided.

Once the pipeline and batches are received, an initial task graph 510 is created. Within the initial task graph 510, each task either calls transform ("t") or partially fits ("p") an operator (e.g., PCA) on a batch (e.g., batch number zero). Here, the term "partial fit" refers to training an operator only partially, using one batch of training data, as opposed to fully on all training data. The edges in the initial task graph 510 indicate dependencies, where one task must happen before another task. The following symbols indicate a status associated with each task: a "*" symbol indicates a completed task, a "$" symbol indicates a ready task that is scheduled for execution next, an "&" symbol indicates a task that is ready but not yet scheduled for execution next, and a "!" symbol indicates a blocked task.

After creating the initial task graph 510, the initial task graph 510 is executed with a resource-aware schedule to create an updated task graph 512. The resource-aware schedule repeatedly picks a next task to execute, and then runs that task, causing the status of some tasks in the graph to be updated. Sometimes, there can be more than one ready task that is eligible to be scheduled (e.g., tasks having a "$" or "&" symbol). For example, the box "task graph (later)" in FIG. 5 shows such a situation, where both task "t_PCA^1" (having an "&" symbol) and task "p_SGD^0" (having a "$" symbol) are ready. In such a situation, the decision of which task to pick is up to the resource aware schedule. For example, a decision diagram may select the task to schedule. By being aware of resources such as available memory, the choice can save unnecessary work such as loading data from disk and thus speed up training.

Figure 6:
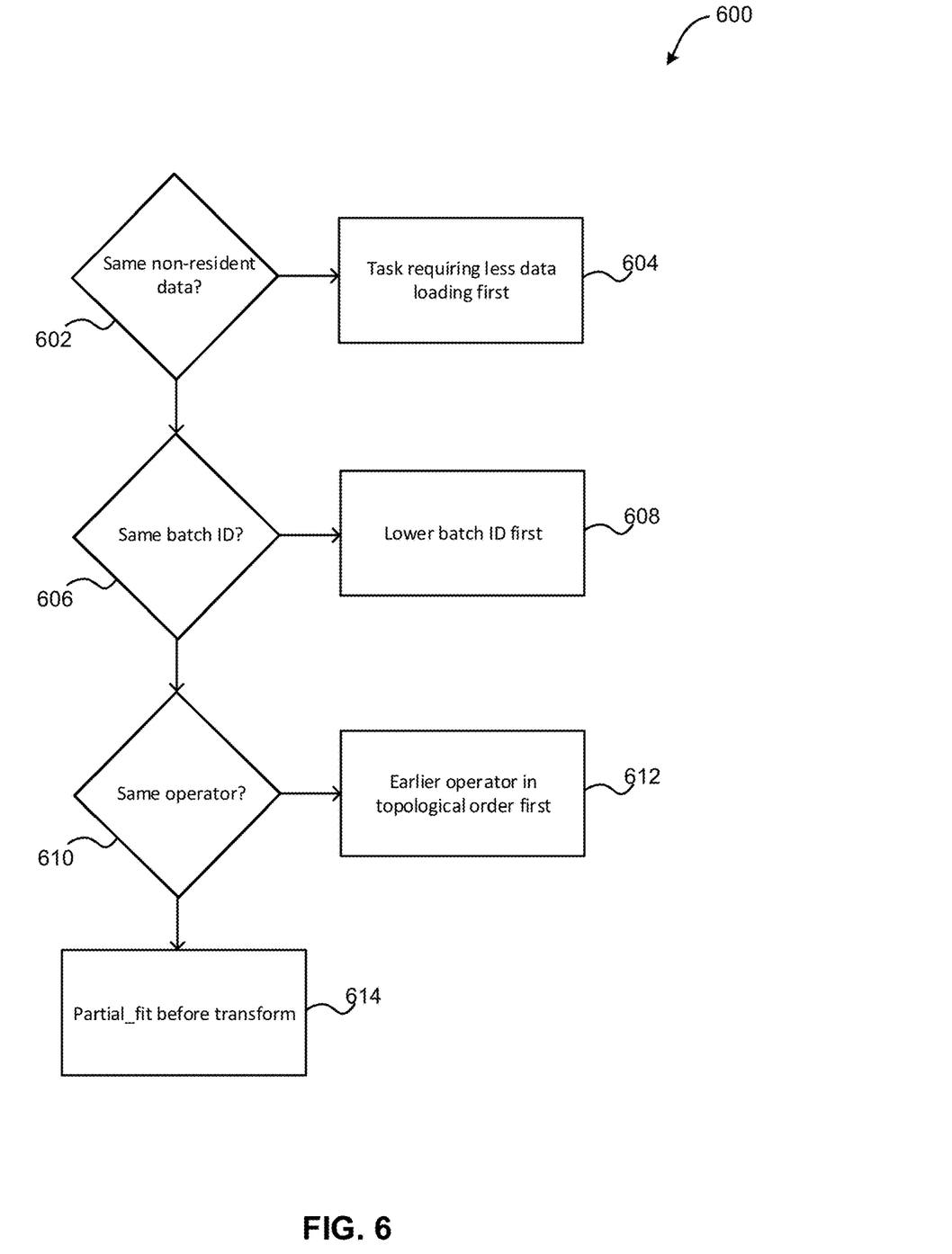
FIG. 6 illustrates a flowchart of an exemplary decision diagram, in accordance with one aspect of the present invention.

Now referring to FIG. 6, a flowchart of an exemplary decision diagram 600 is shown according to one aspect. The exemplary decision diagram 600 may be performed in accordance with the present invention in any of the environments depicted in FIGS. 1-3 and 5, among others, in various aspects. Of course, greater or fewer operations than those specifically described in FIG. 6 may be included in exemplary decision diagram 600, as would be understood by one of skill in the art upon reading the present descriptions.

Each of the steps of the exemplary decision diagram 600 may be performed by any suitable component of the operating environment. For example, in various aspects, the exemplary decision diagram 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the exemplary decision diagram 600. Illustrative processors include, but are not limited to, a central processing unit (CPU), an application specific integrated circuit (ASIC), a field programmable gate array (FPGA), etc., combinations thereof, or any other suitable computing device known in the art. In one aspect, the exemplary decision diagram 600 may be applied to two or more tasks derived from a machine learning pipeline.

As shown in FIG. 6, exemplary decision diagram 600 may initiate with decision 602, where it is determined whether each of the two or more tasks require the same non-resident data. In response to determining in decision 602 that each of the two or more tasks do not require the same non-resident data, decision diagram 600 may proceed with operation 604, where the task requiring less data to be loaded into the pipeline is selected to be implemented first within the pipeline.

Additionally, in response to determining in decision 602 that each of the two or more tasks require the same non-resident data, decision diagram 600 may proceed with decision 606, where it is determined whether the two or more tasks have the same batch ID. In response to determining in decision 606 that the two or more tasks do not have the same batch ID, decision diagram 600 may proceed with operation 608, where the task having the lower batch ID is selected to be implemented first within the pipeline.

Further, in response to determining in decision 606 that the two or more tasks do have the same batch ID, decision diagram 600 may proceed with decision 610, where it is determined whether all of the two or more tasks have the same operator. In response to determining in decision 610 that all of the two or more tasks do not have the same operator, decision diagram 600 may proceed with operation 612, where the task having an earlier operator in topological order is selected to be implemented first within the pipeline.

Further still, in response to determining in decision 610 that all of the two or more tasks have the same operator, decision diagram 600 may proceed with operation 614, where a partial_fit task is selected to be implemented before a transform task within the pipeline.

In this way, the exemplary decision diagram 600 may be applied to a task graph to determine a prioritized order in which tasks are implemented. It should be noted that although certain priorities (e.g., with respect to operators, tasks, batch IDs, etc.) are included within the exemplary decision diagram 600, other decision diagrams may be implemented that enable other different priorities.

Batched Training for Machine-Learning Pipelines

In one aspect, each node within a task graph may include a task, and a predetermined notation may be used to describe these nodes. For example, the notation "p_O^b" denotes a "partial_fit" task for an operator "O" on batch number "b". The notation "t_O^b" denotes a "transform" task for an operator "O" on batch number "b". There are also two additional kinds of tasks that do not show up explicitly in the task graph, because they are instead performed on-demand, as needed while executing other tasks. The notation "s_O^b" denotes spilling the output data that operator "O" produced on batch "b". Here, "spilling" means saving intermediate data on disk, so it can be removed from memory, thus freeing up memory to make room for other data. Similarly, "l_O^b" denotes (re-)loading the output of operator "O" on batch "b". Loading means copying data from disk back into memory, so it is now resident and can be used to execute a later task that depends on it.

To create an initial task graph, a system may create edges between tasks based on their dependencies. If a given task depends on some other task, then the system creates an edge from that other task to the given task. Given a task "p_O^b", the system creates an edge from the task for "p_O^{b-1}" (if any) to "p_O^b". Also, for each operator "P" that is a predecessor of "O" in the pipeline, it creates an edge from "t_P^b" to "p_O^b". Next, given a task "t_O^b", the system creates an edge from "p_O^{lastBatchId}" to "t_O^b", where lastBatchId is the highest batch number (e.g., if there are 5 batches numbered 0, 1, 2, 3, 4, then lastBatchId is 4). Also, for each operator "P" that is a predecessor of "O" in the pipeline, it creates an edge from "t_P^b" to "t_O^b".

Additionally, in one aspect, a resource-aware schedule may save costs during training.

For example, a baseline execution of a task graph with a resource oblivious schedule may perform the following decision-making: when there are two tasks eligible to be executed next within a pipeline: "t_PCA^1" and "p_SDG^0", The baseline may pick "t_PCA^1". Before it can execute, it must load the data from "t_INP^1" which is currently spilled; and it has to spill the data from "t_PCA^0" which is currently resident to ensure there is enough room for the output from "t_PCA^1" when it executes. After this first task execution, the only task eligible to fire is "p_SGD^0". Unfortunately, it needs the output data from "t_PCA^0" which was just spilled to disk in the previous step. So it needs to load that before being able to execute.

In contrast, an execution of the task graph with a resource aware schedule may perform the following decision-making: The initial task graph is the same as for the baseline, with two tasks eligible to be executed next: "t_PCA^1" and "p_SDG^0". But this time, instead of picking "t_PCA^1" like in the resource oblivious schedule, the system picks "p_SGD^0". All data needed by this task is already resident, so it can execute without any further load or spill operations.

Further, in one aspect, the task status may be updated dynamically without having to execute the task in the case where the task is marked as fully trained early instead of going through partial_fit over all the batches. For example, a pipeline may have two nodes: EMB and SMP. In a first task graph, a t_EMB^0 task may be selected as it has a lower batch number than t_EMB^1. Once it is executed, an input for a p_SMP^0 task may be already in memory, and may therefore be selected next. The SMP operator is a sampling operator in this example, which means that it can be trained on a single sample, and can declare itself as fully trained once that is done. At the completion of task p_SMP^0, the task may be declared as fully trained. The status of all the "p_SMP" tasks may then be updated to avoid any more training of SMP.

Further still, in one aspect, machine learning pipelines may have a linear structure, or may have two or more parallel paths for preprocessing.

In one aspect, a system is provided for batched training of machine-learning pipelines, comprising the steps of receiving a machine-learning pipeline and a specification of data batches, creating a set of tasks, including partial-fit and transform tasks, and executing the set of tasks with resource usage-aware schedule.

In another aspect, some data batches are spilled to make room for other batches to reside in memory. For example, if needed/desired, batches may be spilled from memory to disk/network/external storage. Resource-aware scheduling may minimize these spills (which are expensive).

In yet another aspect, the task graph creation and execution saves work when some operators are fully trained early. For example, if it can be determined (either statically or dynamically) that after some amount of training, an operator does not need to train on the rest of the batches, we can skip those training operations. The ability to do this dynamically is important with some sampling use cases, where it is not known in advance when "enough" data is seen; this can be determined only after actually training some batches.

Also, in one aspect, batching is added to non-batched pipeline components via sampling. For example, sampling may be performed from a larger data set to create a batch that can be fit as usual. That batch may be applied to the entire data set when transforming. The ability to skip unneeded training is synergistic.

In another aspect, tasks are executed in a priority order that considers one or more of the following:
batch ID
pipeline topology
batch spilling state
computational resources For example, a task scheduler can take other factors into account when it is deciding how to prioritize running tasks.

In yet another aspect, batches may be cached across the training of multiple pipelines. For example, instead of caching the batch results only for a single pipeline execution, cached batches may be reused across the execution of multiple pipelines that share components (or different version of a pipeline, as happens during iterative experimentation with creating the pipeline).

In addition, in one aspect, the task graph creation may be performed lazily. For example, instead of creating a task graph from a given pipeline specifications, and then scheduling it, a beginning task may be created from the pipeline specification, and tasks may be added to the graph dynamically as needed. This may improve flexibility and performance.

In another aspect, tasks may be scheduled across multiple pipeline trainings. For example, similar to caching across multiple pipelines, if multiple pipelines are executed in parallel, resource-aware scheduling may be performed across all currently running pipelines (rather than use separate non-communicating schedulers for each pipeline execution).

In yet another aspect, the task graph execution may use parallelism. For example, multiple non-dependent tasks may be scheduled simultaneously. This may present additional resource constraints to be monitored by the schedule when making scheduling decisions. Additionally, the scheduler could look at how much parallelism scheduling a node enables when scheduling.

Further, in one aspect, within a hybrid execution mode, batched training may be performed for only a subset of the operators in the pipeline. For example, scheduling batched machine learning may be performed for an entire pipeline, or for a pipeline where only parts of the pipeline use batched learning.

In one aspect, a method is provided for batched training of machine-learning pipelines, the method comprising receiving by a computing device a machine-learning pipeline and a specification of one or more data batches associated with the machine-learning pipeline; creating by the computing device a set of tasks, the tasks including a partial-fit and transform tasks; transforming by the computing device the set of tasks into a task graph; and executing by the computing device the task graph associated with the machine-learning pipeline with resource usage-aware scheduling.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
   identifying a machine learning pipeline and a plurality of training data batches;
   creating a plurality of tasks, based on the machine learning pipeline, the tasks including a transform task that includes an instance where an operator takes training data of one of the training data batches as input and outputs computed data, the tasks including a partial-fit task that includes an instance where an operator is trained partially using a single batch of the plurality of training data batches; and
   determining an order in which the plurality of tasks is executed, utilizing a resource usage-aware approach, wherein the partial-fit task is prioritized over the transform task such that the partial-fit task is placed before the transform task within the determined order.

2. The computer-implemented method of claim 1, wherein the machine learning pipeline includes a plurality of operators that perform the tasks on the training data batches, wherein each of the operators is connected to another of the operators via a data flow edge within the machine learning pipeline, the data flow edge indicating a flow of data from one of the operators to another of the operators.

3. The computer-implemented method of claim 1, wherein each of the training data batches includes a different subset of a larger group of training data.

4. The computer-implemented method of claim 1, wherein the tasks include operations performed on training data by operators within the machine learning pipeline.

5. The computer-implemented method of claim 1, comprising generating a task graph from the plurality of tasks; identifying one or more of the tasks in the task graph as moot; and removing the one or more moot tasks from a schedule.

6. The computer-implemented method of claim 1, wherein the tasks include partial-fit and transform tasks, wherein a task graph is created by analyzing tasks performed by each of a plurality of operators within the machine learning pipeline, where dependencies between the tasks are identified and incorporated into the task graph.

7. The computer-implemented method of claim 1, wherein the plurality of tasks are included within a task graph that is created lazily by adding a beginning one of the tasks to the task graph, and adding subsequent ones of the tasks to the task graph dynamically as needed.

8. The computer-implemented method of claim 1, wherein a schedule is created that indicates the order in which the plurality of tasks is implemented.

9. The computer-implemented method of claim 1, wherein the order in which the plurality of tasks is implemented is based at least in part on one or more parameters selected from the group consisting of: a batch ID for each task, a pipeline topology, and a batch spilling state.

10. The computer-implemented method of claim 1, wherein the resource usage-aware approach accounts for resource usage including data loading and spilling within the machine learning pipeline, wherein the tasks include a spill task that transfers data from local memory utilized by the machine learning pipeline to a different storage location.

11. The computer-implemented method of claim 1, wherein in response to determining that a task graph indicates that any of a plurality of tasks may be performed in a single time period, predetermined decision criteria is applied to metadata associated with each of the tasks that may be performed in the single time period to determine an order in which the tasks that may be performed in the single time period are to be performed within a schedule.

12. The computer-implemented method of claim 1, wherein the resource usage-aware approach removes redundant tasks within a schedule.

13. The computer-implemented method of claim 1, wherein one or more of the training data batches is cached and used for multiple different machine learning pipelines.

14. The computer-implemented method of claim 1, wherein multiple different machine learning pipelines are trained in parallel using the training data batches, and tasks are scheduled across the multiple different machine learning pipelines.

15. The computer-implemented method of claim 1, wherein multiple different tasks are implemented in parallel within a schedule.

16. The computer-implemented method of claim 1, comprising adding batching to non-batched pipeline components via sampling.

17. The computer-implemented method of claim 1, wherein batched training is performed within a hybrid execution mode for only a subset of a plurality of operators in the machine learning pipeline.

18. A computer program product comprising one or more computer readable storage media, and program instructions collectively stored on the one or more computer readable storage media, the program instructions comprising instructions configured to cause one or more processors to perform a method comprising:
identifying, by the one or more processors, a machine learning pipeline and a plurality of training data batches;
creating, by the one or more processors, a plurality of tasks, based on the machine learning pipeline, the tasks including a transform task that includes an instance where an operator takes training data of one of the training data batches as input and outputs computed data, the tasks including a partial-fit task that includes an instance where an operator is trained partially using a single batch of the plurality of training data batches; and
determining, by the one or more processors, an order in which the plurality of tasks is executed, utilizing a resource usage-aware approach, wherein the partial-fit task is prioritized over the transform task such that the partial-fit task is placed before the transform task within the determined order.

19. A system, comprising:
a processor; and
logic integrated with the processor, executable by the processor, or integrated with and executable by the processor, the logic being configured to:
identify a machine learning pipeline and a plurality of predefined training data batches;
create a plurality of tasks, based on the machine learning pipeline, the tasks including a transform task that includes an instance where an operator takes training data of one of the training data batches as input and outputs computed data, the tasks including a partial-fit task that includes an instance where an operator is trained partially using a single batch of the plurality of training data batches; and
determine an order in which the plurality of tasks is executed, utilizing a resource usage-aware approach, wherein the partial-fit task is prioritized over the transform task such that the partial-fit task is placed before the transform task within the determined order.

20. The computer-implemented method of claim 1, wherein the tasks include a training task that trains an operator; and comprising identifying the training task as moot in response to determining that, according to a schedule, the operator is already trained before the training task occurs within the schedule; and removing the training task from the schedule.

* * * * *